US012625320B2

(12) United States Patent
Bian et al.

(10) Patent No.: US 12,625,320 B2
(45) Date of Patent: May 12, 2026

(54) PHOTODETECTORS WITH AN ADJOINED SLOTTED WAVEGUIDING STRUCTURE

(71) Applicant: GlobalFoundries U.S. Inc., Malta, NY (US)

(72) Inventors: Yusheng Bian, Ballston Lake, NY (US); Won Suk Lee, Malta, NY (US); Sujith Chandran, Clifton Park, NY (US); Abdelsalam Aboketaf, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 337 days.

(21) Appl. No.: 18/409,332

(22) Filed: Jan. 10, 2024

(65) Prior Publication Data

US 2025/0224560 A1 Jul. 10, 2025

(51) Int. Cl.
*G02B 6/122* (2006.01)
*G02B 6/13* (2006.01)

(52) U.S. Cl.
CPC ............. *G02B 6/1228* (2013.01); *G02B 6/13* (2013.01)

(58) Field of Classification Search
CPC ...... G02B 6/13; G02B 6/006; G02B 6/12004; G02B 6/1228; G02B 6/122
See application file for complete search history.

(56) References Cited

U.S. PATENT DOCUMENTS

| | | | |
|---|---|---|---|
| 7,792,393 B2 | 9/2010 | Hochberg et al. | |
| 8,203,115 B2 | 6/2012 | Hochberg et al. | |
| 11,531,164 B2 | 12/2022 | Dezfulian et al. | |
| 2015/0108336 A1* | 4/2015 | Dong ...................... | G02B 6/12 |
| | | | 250/227.28 |
| 2021/0333818 A1 | 10/2021 | Harris et al. | |

OTHER PUBLICATIONS

Lischke, S., Peczek, A., Morgan, U.S et al. "Ultra-fast germanium photodiode with 3-dB bandwidth of 265 GHz. Nature Photonics" 15, 925-931 (2021). https://doi.org/10.1038/s41566-021-00893-w.
Lischke, S et al., "Ge Photodiode with -3 dB OE Bandwidth of 110 GHz for PIC and ePIC Platforms." in IEEE; DOI:10.1109/IEDM13553. 2020.9372033; 4 pages (2020).
Lischke, Stefan & Knoll, D. & Mai, Christian & Zimmermann, Lars. "Advanced photonic BiCMOS technology with high-performance Ge photo detectors." 20. 10.1117/12.2530143. (2019).

(Continued)

*Primary Examiner* — Michael P Mooney
(74) *Attorney, Agent, or Firm* — Thompson Hine LLP; Anthony Canale

(57) ABSTRACT
Structures for a photonics chip that include a photodetector and methods of forming such structures. The structure comprises a photodetector including a pad and a semiconductor layer on the pad. The structure further comprises a waveguiding structure including a first waveguide core, a second waveguide core, a slot between the first waveguide core and the second waveguide core, and a plurality of waveguide core segments. The waveguiding structure is adjoined to a side edge of the pad adjacent to the semiconductor layer. Each of the plurality of waveguide core segments includes a portion that is disposed in the slot.

20 Claims, 11 Drawing Sheets

(56) References Cited

OTHER PUBLICATIONS

Stefan Lischke et al., "High bandwidth, high responsivity waveguide-coupled germanium p-i-n photodiode," Optics Express 23, 27213-27220 (2015).

Kazanskiy, N.L. et al., "Subwavelength Grating Double Slot Waveguide Racetrack Ring Resonator for Refractive Index Sensing Application." Sensors 2020, 20, 3416. https://doi.org/10.3390/s20123416.

Xiao Hu et al., "High-speed and high-power germanium photodetector with a lateral silicon nitride waveguide," Photonics Research 9, 749-756 (2021).

Wu, L.; Lv, D.; Zhao, N.; Wang, R.; Wu, A. "Research on Germanium Photodetector with Multi-Mode Waveguide Input." Photonics 2023, 10, 455. https://doi.org/10.3390/photonics10040455.

H. Chen et al., "-1 V bias 67 GHz bandwidth Si-contacted germanium waveguide p-i-n photodetector for optical links at 56 Gbps and beyond," Optics Express 24, 4622-4631 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).

Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th31.4 (2020).

Y. Bian et al., "Monolithically integrated silicon nitride platform," 2021 Optical Fiber Communications Conference and Exhibition (OFC), pp. 1-3; Th1A.46 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

A. Chowdhury et al., "High Performance Avalanche Photodiode in a Monolithic Silicon Photonics Technology," 2022 Optical Fiber Communications Conference and Exhibition (OFC), 2022, pp. 1-3.

W. S. Lee et al., "Automatic Waveguide Balancing Using Point Set Operations," 2022 Optical Fiber Communications Conference and Exhibition (OFC), San Diego, CA, USA, 2022, pp. 1-3.

Y. Bian et al., "3D Integrated Laser Attach Technology on a 300-mm Monolithic CMOS Silicon Photonics Platform," in IEEE Journal of Selected Topics in Quantum Electronics, vol. 29, No. 3: Photon. Elec. Co-Inte. and Adv. Trans. Print., pp. 1-19, May-Jun. 2023, Art No. 8200519, doi: 10.1109/JSTQE.2023.3238290.

Y. Bian et al., "Monolithically integrated self-aligned SiN edge coupler with <0.6/0.8 dB TE/TM insertion loss, <-39 dB back reflection and >520 mW high-power handling capability," in Optical Fiber Communication Conference (OFC) 2023, Technical Digest Series (Optica Publishing Group, 2023), paper M3C.3.

Y. Bian et al., "Polarization mode dispersion in CMOS-integrated monolithic SiPh components: simulations and experiments," 2023 Optical Fiber Communications Conference and Exhibition (OFC), San Diego, CA, USA, 2023, pp. 1-3, doi: 10.1364/OFC.2023.Th2A. 24.

Liu, Weixin et al., "Suspended silicon waveguide platform with subwavelength grating metamaterial cladding for long-wave infrared sensing applications" Nanophotonics, vol. 10, No. 7, 2021, pp. 1861-1870. https://doi.org/10.1515/nanoph-2021-0029.

Bian, Yusheng, "Photodetectors With One or More Confining Features" filed on May 23, 2023 as a U.S. Appl. No. 18/200,683.

Hartmut Presting, "Near and mid infrared silicon/germanium based photodetection," Thin Solid Films, vol. 321, Issues 1-2, 1998, pp. 186-195, ISSN 0040-6090, https://doi.org/10.1016/S0040-6090(98)00471-4.

European Patent Office, Extended European Search Report and Opinion issued in European Patent Application No. 24187634.1 on Jan. 2, 2025; 13 pages.

* cited by examiner

PHOTODETECTORS WITH AN ADJOINED SLOTTED WAVEGUIDING STRUCTURE

BACKGROUND

The disclosure relates to photonics chips and, more specifically, to structures for a photonics chip that include a photodetector and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser. A photodetector may be employed in the photonic integrated circuit to convert light, which may be modulated as an optical signal, into an electrical signal. The responsivity of a photodetector is a measure of the optical-to-electrical conversion efficiency. The bandwidth of a photodetector is a measure of the speed with which the photodetector responds to variations in the incident optical power. Generally, design modifications that improve the bandwidth of a photodetector will reduce the responsivity.

Improved structures for a photonics chip that include a photodetector and methods of forming such structures are needed.

SUMMARY

In an embodiment of the invention, a structure for a photonics chip is provided. The structure comprises a photodetector including a pad and a semiconductor layer on the pad. The structure further comprises a waveguiding structure including a first waveguide core, a second waveguide core, a slot between the first waveguide core and the second waveguide core, and a plurality of waveguide core segments. The waveguiding structure is adjoined to a side edge of the pad adjacent to the semiconductor layer. Each of the plurality of waveguide core segments includes a portion that is disposed in the slot.

In an embodiment of the invention, a method of forming a structure for a photonics chip is provided. The method comprises forming a photodetector that includes a pad and a semiconductor layer on the pad, and forming a waveguiding structure that includes a first waveguide core, a second waveguide core, a slot between the first waveguide core and the second waveguide core, and a plurality of waveguide core segments. The waveguiding structure is adjoined to a side edge of the pad adjacent to the semiconductor layer, and each of the plurality of waveguide core segments includes a portion that is disposed within the slot.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
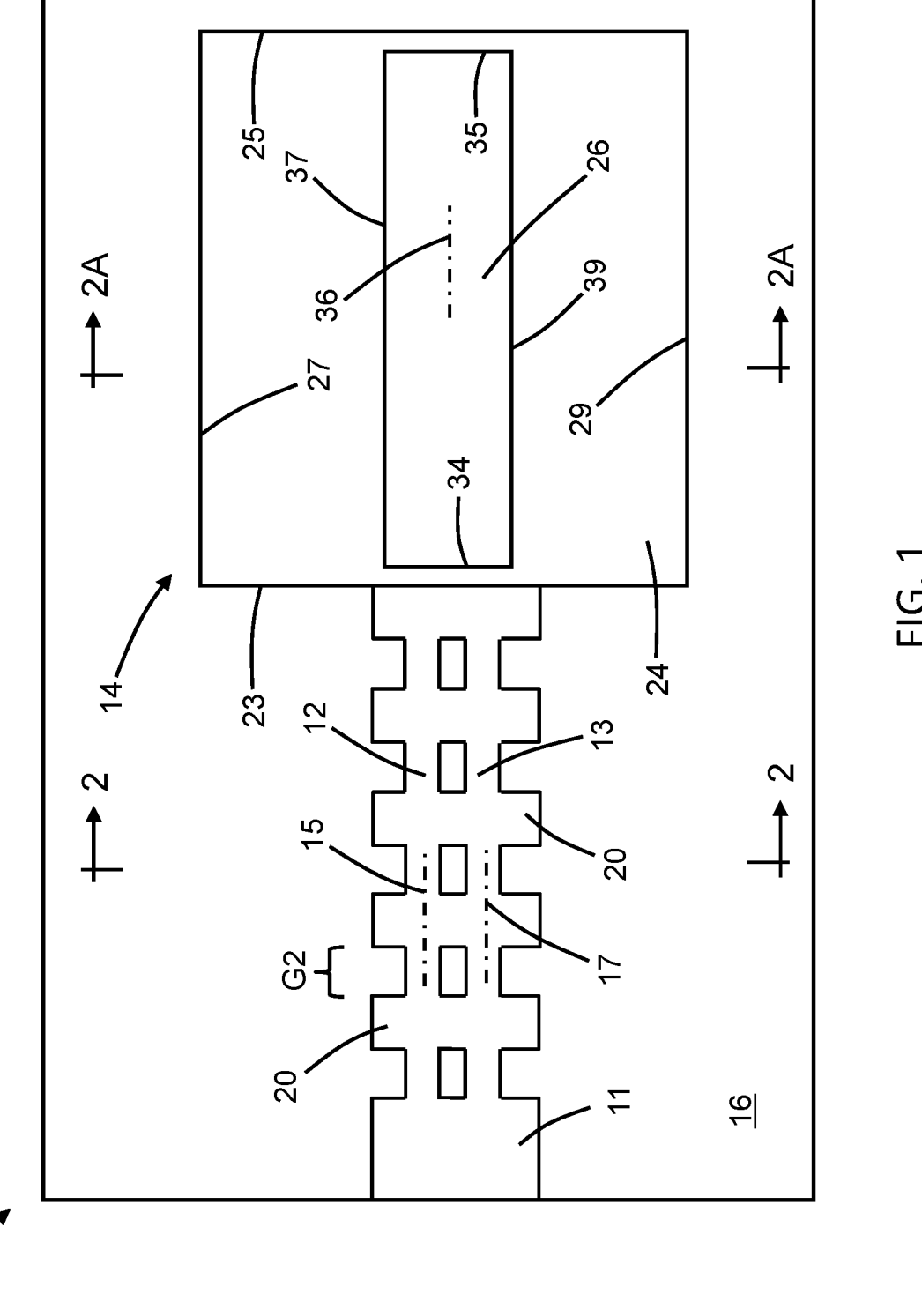
FIG. 1 is a top view of a structure at an initial fabrication stage of a processing method in accordance with embodiments of the invention.
Figure 2:
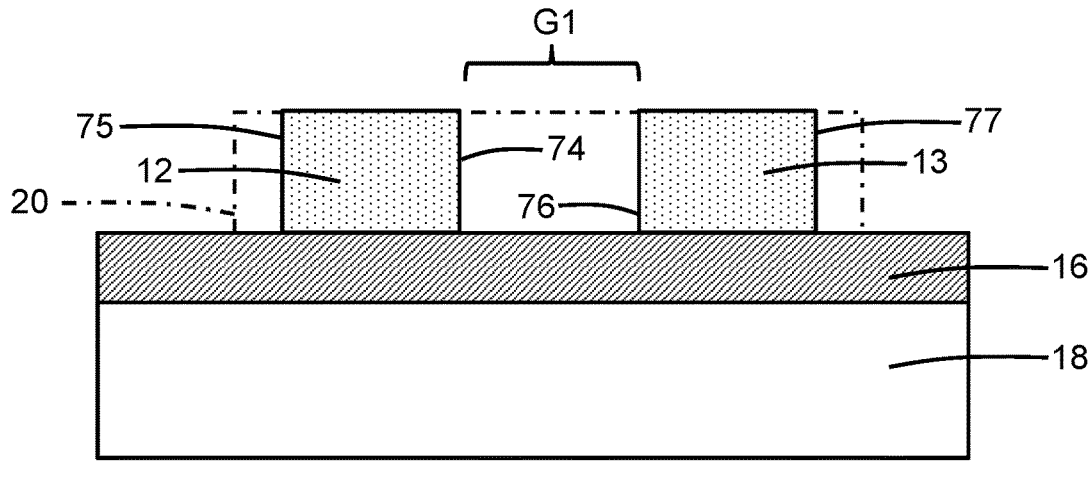
FIG. 2 is a cross-sectional view taken generally along line 2-2 in FIG. 1.
Figure 2A:
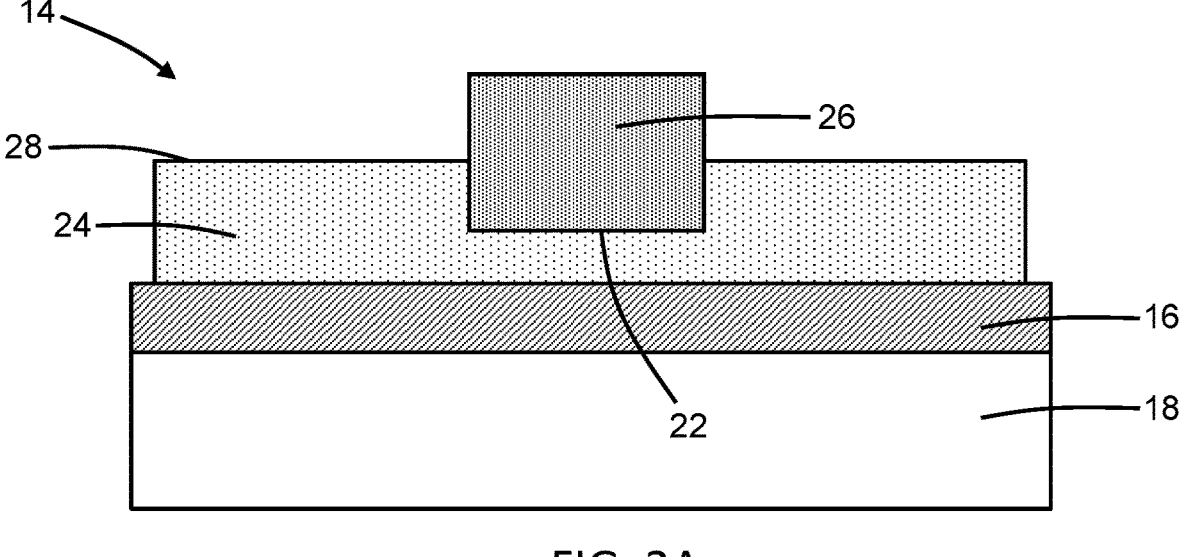
FIG. 2A is a cross-sectional view taken generally along line 2A-2A in FIG. 1.

With reference to FIGS. 1, 2, 2A and in accordance with embodiments of the invention, a structure 10 includes a waveguide core 11, a waveguide core 12, a waveguide core 13, and a photodetector 14 that are positioned on, and above, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate, the dielectric layer 16 may be disposed between the waveguide cores 11, 12, 13 and the semiconductor substrate 18, and the dielectric layer 16 may provide low-index cladding for the waveguide core 12 and the photodetector 14.

The photodetector 14 includes a pad 24 having a side edge 23, a side edge 25 opposite from the side edge 23, a side edge 27, and a side edge 29 opposite from the side edge 27. The side edges 23, 25, 27, 29 may surround an outer perimeter of the pad 24, and the side edges 23, 25, 27, 29 may extend to the dielectric layer 16. The photodetector 14 further includes a semiconductor layer 26 providing a light-absorbing layer that is disposed on the pad 24 with an inward spacing from the outer perimeter of the pad 24. The semiconductor layer 26 may have a sidewall 34 that is positioned adjacent to the side edge 23 of the pad 24, a sidewall 35 that is positioned adjacent to the side edge 25 of the pad 24, a sidewall 37 that is positioned adjacent to the side edge 27 of the pad 24, and a sidewall 39 that is positioned adjacent to the side edge 29 of the pad 24. The semiconductor layer 26 extends lengthwise on the pad 24 along a longitudinal axis 36 from the sidewall 34 to the sidewall 35. In an embodiment, the semiconductor layer 26 may be disposed equidistant from the side edge 27 and the side edge 29.

The waveguide core 12 and the waveguide core 13 may be symmetrically positioned along the side edge 23 of the pad 24 on opposite sides of the longitudinal axis 36 of the semiconductor layer 26. The waveguide cores 12, 13 may extend lengthwise along respective longitudinal axes 15, 17.

The longitudinal axes 15, 17 of the waveguide cores 12, 13 may be aligned parallel to the longitudinal axis 36 of the semiconductor layer 26. The waveguide core 12 is disposed adjacent to the waveguide core 13 with a slot or gap G1 between the waveguide core 12 and the waveguide core 13. In an embodiment, the gap G1 separating the waveguide core 12 from the waveguide core 13 may be centered relative to the longitudinal axis 36 of the semiconductor layer 26.

The waveguide cores 12, 13 contribute to a waveguiding structure that is slotted and that is configured to guide light from the waveguide core 11 to the photodetector 14. The waveguiding structure further includes waveguide core segments 20 that are overlaid or superimposed on the waveguide cores 12, 13. The waveguide core segments 20 are distributed with a spaced relationship along the longitudinal axis 15 of the waveguide core 12 and the longitudinal axis 17 of the waveguide core 13. In an embodiment, the length dimension of each of the waveguide core segments 20 may be aligned transverse to the longitudinal axes 15, 17.

In an embodiment, each waveguide core segment 20 may include a portion that is disposed within the gap G1 between an inner sidewall 74 of the waveguide core 12 and an inner sidewall 76 of the waveguide core 13. In an embodiment, each waveguide core segment 20 may include a bridging portion that extends fully across the gap G1 from the inner sidewall 74 of the waveguide core 12 to the inner sidewall 76 of the waveguide core 13, a projecting end portion that projects outwardly from an outer sidewall 75 of the waveguide core 12, and a projecting end portion that projects outwardly from an outer sidewall 77 of the waveguide core 13. The inner sidewall 74 of the waveguide core 12 is disposed adjacent to the inner sidewall 76 of the waveguide core 13 across the gap G1, the outer sidewall 75 of the waveguide core 12 is disposed opposite from the inner sidewall 74, and the outer sidewall 77 of the waveguide core 13 is disposed opposite from the inner sidewall 76.

The waveguiding structure including the waveguide cores 12, 13 and the waveguide core segments 20 has an envelope represented by a smooth curve following the opposite edges of the projecting end portions of the waveguide core segments 20. In the representative embodiment, the envelope of the waveguiding structure has an effective width dimension that is constant. In an alternative embodiment, the envelope of the waveguiding structure may have an effective width dimension that is tapered. In an alternative embodiment, the envelope of the waveguiding structure may be tapered with an effective width dimension that changes either linearly or non-linearly with decreasing distance from the side edge 23 of the pad 24. In an alternative embodiment, the envelope of the waveguiding structure may be tapered with an effective width dimension that increases either linearly or non-linearly with decreasing distance from the side edge 23 of the pad 24.

The waveguide core segments 20 are characterized by a pitch and a width, and adjacent pairs of the waveguide core segments 20 are separated by a gap G2. In an embodiment, the waveguide core segments 20 may have a uniform pitch, width, and gap G2. In an alternative embodiment, the pitch and gap G2 of the waveguide core segments 20 may vary with position along the longitudinal axes 15, 17 of the waveguide cores 12, 13 and relative to the side edge 23 of the pad 24. In an alternative embodiment, the width of the waveguide core segments 20 may vary with position relative to the side edge 23 of the pad 24. In alternative embodiments, the pitch and/or the duty cycle of the waveguide core segments 20 may be apodized (i.e., non-uniform) to define a non-periodic arrangement. In an embodiment, the period of the waveguide core segments 20 may be equal to a half-wavelength, or an integer multiple of a half-wavelength, of the light received by the structure 10. In an alternative embodiment, the sidewalls of the bridging portions of the waveguide core segments 20 may have a curvature and the projecting end portions of the waveguide core segments 20 may be rounded. In an embodiment, the waveguide core segments 20 and gaps G2 may be dimensioned and positioned at small enough pitch such that the waveguide core segments 20 are configured to constitute a subwavelength grating that does not radiate or reflect light at a wavelength of operation, such as a wavelength of operation in a range of 400 nanometers to 3,000 nanometers.

The waveguiding structure including the waveguide cores 12, 13 and the waveguide core segments 20 adjoins (i.e., shares a boundary with) the side edge 23 of the pad 24. In an embodiment, the waveguide core 12 and the waveguide core 13 of the waveguiding structure may adjoin the side edge 23 of the pad 24. In the representative embodiment, the projecting end portions and bridging portion of one of the waveguide core segments 20 may also adjoin the side edge 23 of the pad 24.

The waveguiding structure including waveguide cores 12, 13 and the waveguide core segments 20 provides a lattice-like or grid-like arrangement of features disposed between the waveguide core 11 and the photodetector 14. The waveguide core 11 provides an input to the structure 10 that feeds light to the waveguiding structure. In the representative embodiment, the waveguide core 11 may be non-slotted and solid, as well as abutted with both of the waveguide cores 12, 13 of the waveguiding structure.

In an embodiment, the waveguide cores 11, 12, 13, the waveguide core segments 20, and the pad 24 of the photodetector 14 may be comprised of a material having a refractive index that is greater than the refractive index of silicon dioxide. In an embodiment, the waveguide cores 11, 12, 13, the waveguide core segments 20, and the pad 24 of the photodetector 14 may be comprised of a semiconductor material. In an embodiment, the waveguide cores 11, 12, 13, the waveguide core segments 20, and the pad 24 of the photodetector 14 may be comprised of single-crystal silicon. The waveguide cores 11, 12, 13, the waveguide core segments 20, and the pad 24 of the photodetector 14 may be formed by patterning a layer comprised of their constituent material with lithography and etching processes. In an embodiment, the waveguide cores 11, 12, 13, the waveguide core segments 20, and the pad 24 of the photodetector 14 may be formed by patterning the semiconductor material (e.g., single-crystal silicon) of a device layer of a silicon-on-insulator substrate.

The semiconductor layer 26 of the photodetector 14 may be comprised of a light-absorbing material that can generate charge carriers from photons of absorbed light by photoelectric conversion. In an embodiment, the semiconductor layer 26 may be formed by an epitaxial growth process. In an embodiment, the semiconductor layer 26 may be epitaxially grown inside a trench 22 that is patterned in the pad 24 such that the semiconductor layer 26 includes a lower portion disposed below a top surface 28 of the pad 24 and an upper portion disposed above the top surface 28 of the pad 24. A hardmask comprised of a dielectric material may be disposed on the top surface 28 of the pad 24 and surround the trench 22 during the epitaxial growth process and removed following the epitaxial growth process.

In an embodiment, the semiconductor layer 26 may be comprised of an intrinsic semiconductor material. In an embodiment, the semiconductor layer 26 may be comprised of intrinsic germanium. In an embodiment, the semiconductor layer 26 may be comprised of intrinsic silicon-germanium. In an alternative embodiment, the semiconductor layer 26 may be comprised of a different type of semiconductor material, such as a III-V compound semiconductor material or silicon.

In alternative embodiments, the semiconductor layer 26 may be angled relative to the longitudinal axes 15, 17 of the waveguide cores 12, 13. In alternative embodiments, the semiconductor layer 26 may be patterned to provide a convex, concave, or quadrilateral geometry at the sidewall 34 that may be effective to minimize the optical return loss. In alternative embodiments, the waveguide core segments 20 of the waveguiding structure may be formed using an inverse design algorithm or an optimization algorithm.

Figure 3:
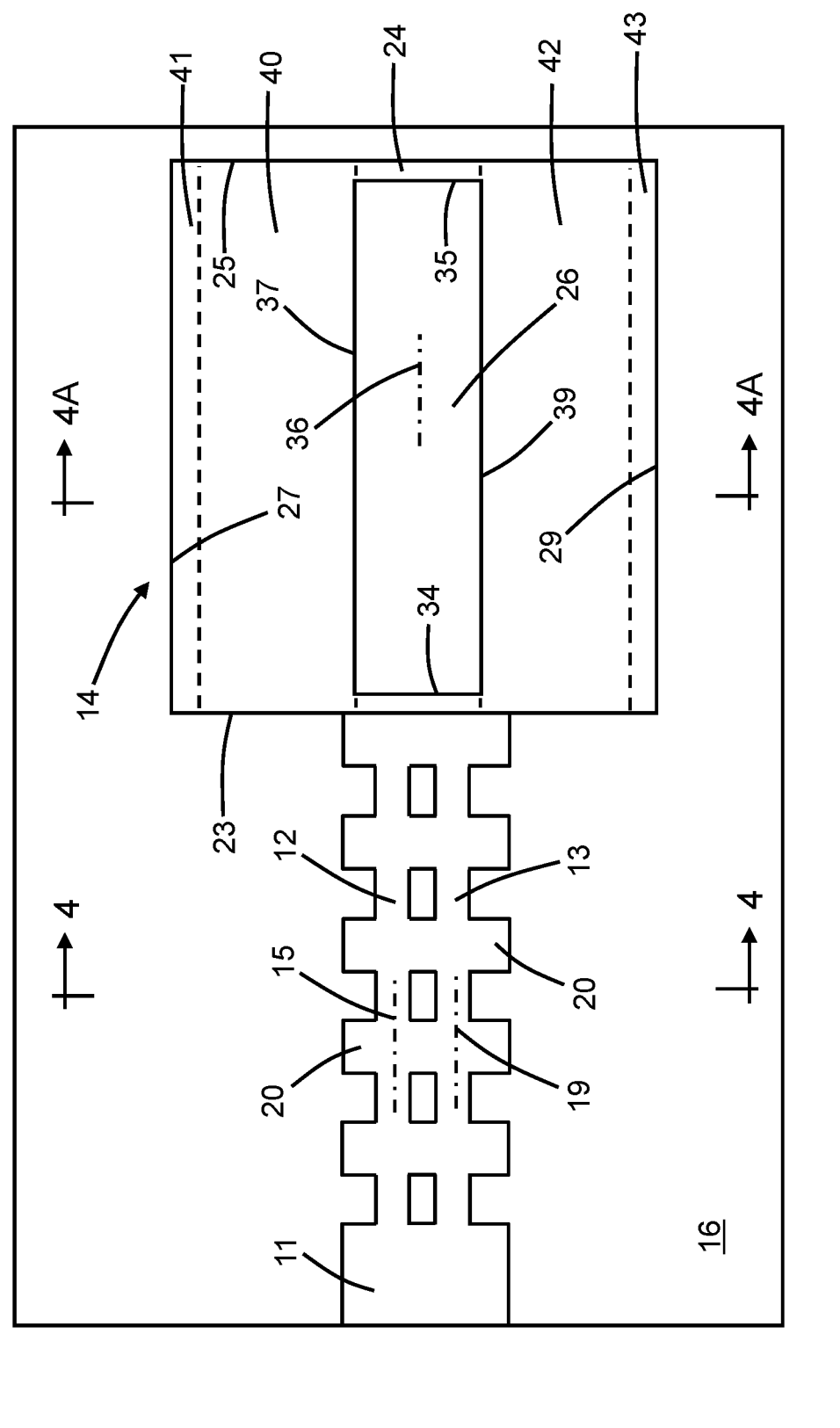
FIG. 3 is a top view of the structure at a fabrication stage of the processing method subsequent to FIGS. 1, 2, 2A.
Figure 4:
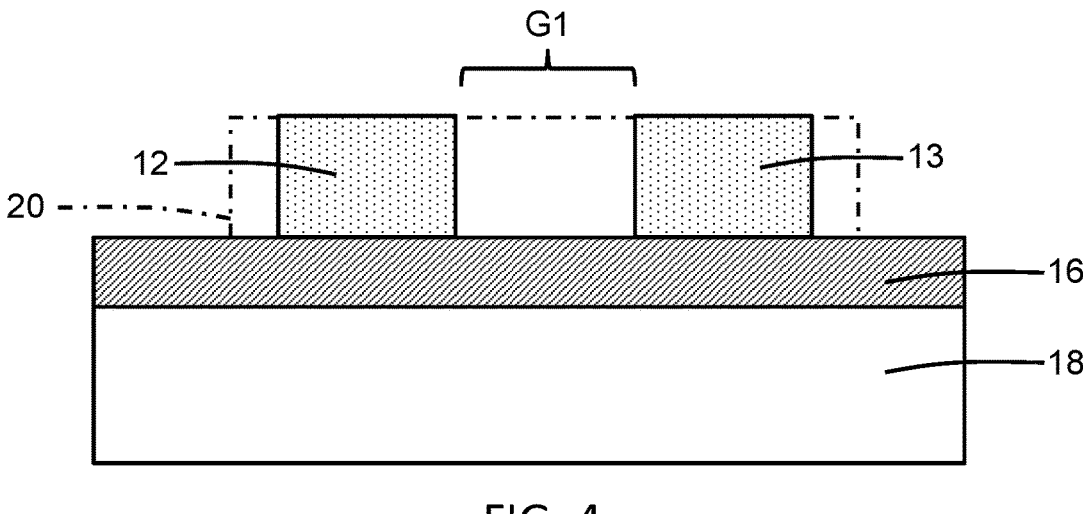
FIG. 4 is a cross-sectional view taken generally along line 4-4 in FIG. 3.
Figure 4A:
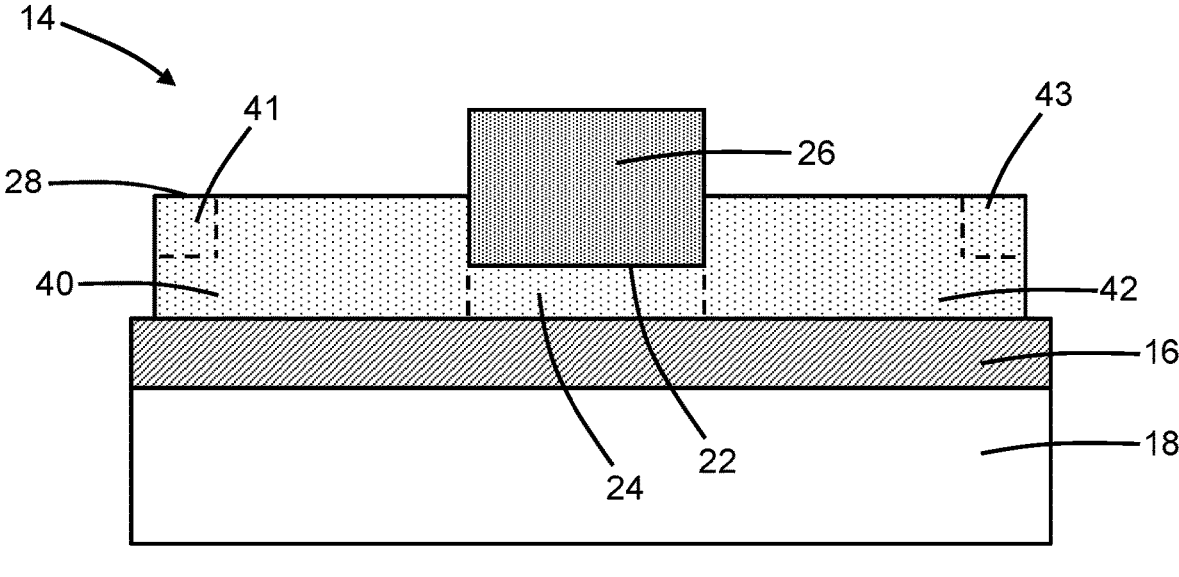
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, the structure 10 may include a doped region 40 that is formed in a portion of the pad 24 adjacent to the sidewall 37 of the semiconductor layer 26 and a doped region 42 that is formed in a portion of the pad 24 adjacent to the sidewall 39 of the semiconductor layer 26. The semiconductor layer 26 is laterally positioned on the pad 24 between the doped region 40 and the doped region 42. The doped regions 40, 42, which differ in conductivity type, may extend fully through the entire thickness of the pad 24 to the underlying dielectric layer 16. The doped region 40 and the doped region 42 may define an anode and a cathode of the photodetector 14.

The doped region 40 may be formed by, for example, ion implantation with an implantation mask having an opening that determines the implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions, such as ion species, dose, and kinetic energy, may be selected to tune the electrical and physical characteristics of the doped region 40. The implantation mask may be stripped after forming the doped region 40. In an embodiment, the semiconductor material of the doped region 40 may contain a p-type dopant, such as boron, that provides p-type electrical conductivity. In an alternative embodiment, a portion of the semiconductor layer 26 immediately adjacent to the doped region 40 and an underlying portion of the pad 24 may be implanted with the p-type dopant due to partial overlap of the opening in the implantation mask with the semiconductor layer 26. In an alternative embodiment, the doped region 40 may have a boundary that is laterally spaced from the sidewall 37 of the semiconductor layer 26 such that a portion of the pad 24 between the semiconductor layer 26 and the doped region 40 is unimplanted.

The doped region 42 may be formed by, for example, ion implantation with an implantation mask having an opening that determines an implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions, such as ion species, dose, and kinetic energy, may be selected to tune the electrical and physical characteristics of the doped region 42. The implantation mask may be stripped after forming the doped region 42. In an embodiment, the semiconductor material of the doped region 42 may contain an n-type dopant, such as phosphorus or arsenic, that provides n-type electrical conductivity. In an alternative embodiment, a portion of the semiconductor layer 26 immediately adjacent to the doped region 42 and an underlying portion of the pad 24 may be implanted with the n-type dopant due to partial overlap of the opening in the implantation mask with the semiconductor layer 26. In an alternative embodiment, the doped region 42 may have a boundary that is laterally spaced from the sidewall 39 of the semiconductor layer 26 such that a portion of the pad 24 between the semiconductor layer 26 and the doped region 42 is unimplanted.

A portion of the pad 24 beneath the semiconductor layer 26 may be comprised of intrinsic semiconductor material, such as intrinsic silicon, that is not doped by the ion implantations forming the doped regions 40, 42. In an embodiment, the intrinsic portion of the pad 24 may extend beneath the semiconductor layer 26 from the side edge 23 of the pad 24 to the side edge 25 of the pad 24. The doped region 40, the intrinsic semiconductor materials of the semiconductor layer 26 and the portion of the pad 24 beneath the semiconductor layer 26, and the doped region 42 may define a lateral p-i-n diode structure that enables the functionality of the photodetector 14.

A heavily-doped region 41 may be formed by a masked ion implantation in a portion of the doped region 40 adjacent to the side edge 27. A heavily-doped region 43 may be formed by a masked ion implantation in a portion of the doped region 42 adjacent to the side edge 29. The heavily-doped region 41 may have the same conductivity type as the doped region 40 but at a higher dopant concentration. The heavily-doped region 43 may have the same conductivity type as the doped region 42 but at a higher dopant concentration.

Figure 5:
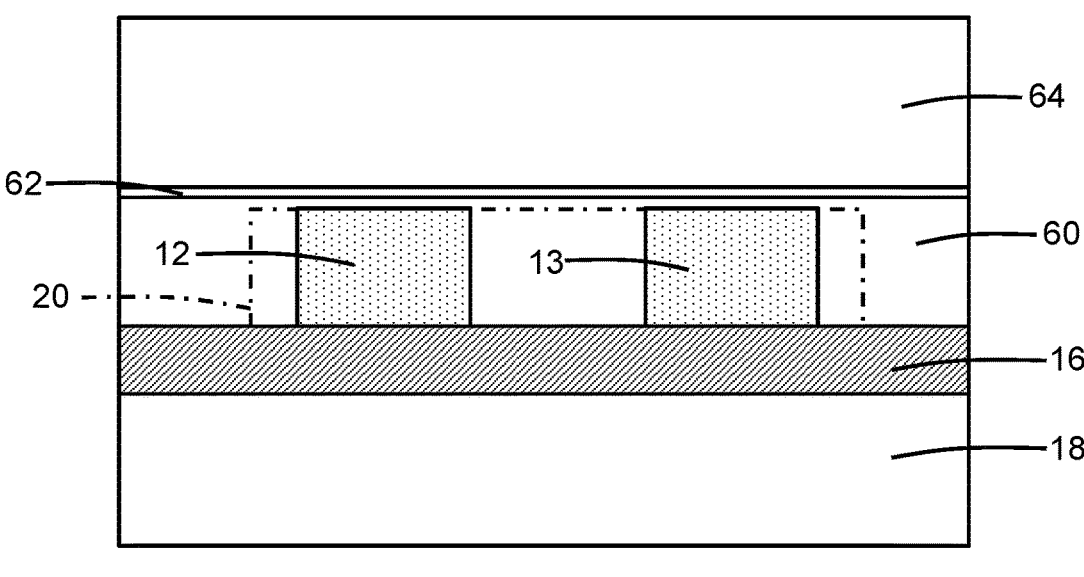
FIGS. 5, 5A are cross-sectional views of the structure at a fabrication stage of the processing method subsequent to FIGS. 3, 4, 4A.
Figure 5A:
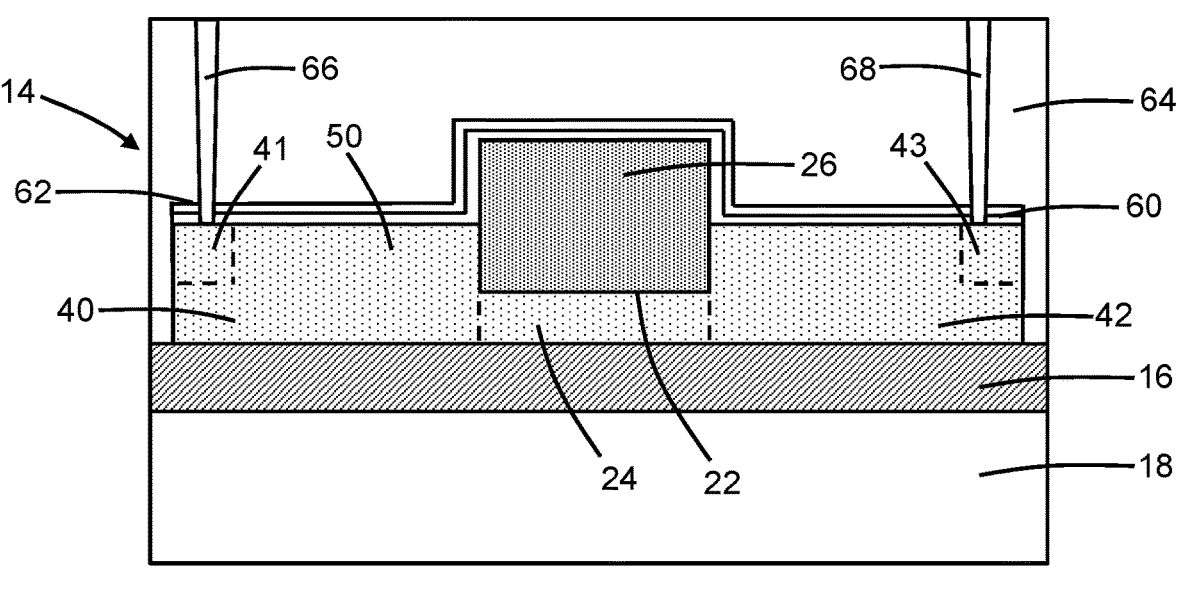

With reference to FIGS. 5, 5A in which like reference numerals refer to like features in FIGS. 3, 4, 4A and at a subsequent fabrication stage, a dielectric layer 60 may be formed over the waveguide core 12 and the photodetector 14. In an embodiment, the dielectric layer 60 may be comprised of a dielectric material, such as silicon dioxide. Portions of the dielectric material of the dielectric layer 60 may fill the gaps G2 between the waveguide core segments 20. The waveguide core segments 20 and the portions of the dielectric material inside the gaps G2 may define a metamaterial structure in which the material constituting the waveguide core segments 20 has a higher refractive index than the dielectric material. The metamaterial structure can be treated as a homogeneous material having an effective refractive index that is intermediate between the refractive index of the material constituting the waveguide core segments 20 and the refractive index of the dielectric material.

A conformal dielectric layer 62 may be formed that extends across the waveguide core 12 and photodetector 14 and that follows the topography created by the semiconductor layer 26. In an embodiment, the conformal dielectric layer 62 may be comprised of a dielectric material, such as silicon nitride. A dielectric layer 64 may be formed on the conformal dielectric layer 62. In an embodiment, the dielectric layer 64 may be comprised of a dielectric material, such as silicon dioxide, that has a lower refractive index than the material of the waveguide core 12. The dielectric layer 64 may be deposited and planarized by chemical-mechanical polishing.

Contacts 66 may be formed that penetrate fully through the dielectric layers 60, 62, 64 to land on the heavily-doped region 41. Contacts 68 may be formed that penetrate fully through the dielectric layers 60, 62, 64 to land on the heavily-doped region 43. The heavily-doped region 41 electrically couples the contacts 66 to the doped region 40 with a reduced contact resistance. The heavily-doped region 43 electrically couples the contacts 68 to the doped region 42 with a reduced contact resistance. The contacts 66, 68 may be comprised of a metal, such as tungsten. The doped regions 40, 42 may be biased through the contacts 66, 68, which may be coupled to interconnects (not shown) in dielectric layers formed over the dielectric layer 64.

In use, light, such as laser light, received from the waveguide core 11 propagates in the waveguiding structure including the waveguide cores 12, 13 and waveguide core segments 20 toward the photodetector 14 and is transferred from the waveguiding structure to the semiconductor layer 26 of the photodetector 14. The waveguiding structure may support propagation of light with transverse-electric polarization, transverse-magnetic polarization, or a combination of both polarizations. In an embodiment, the light received by the photodetector 14 from the waveguiding structure may be modulated as an optical signal. The semiconductor layer 26 absorbs photons of the light and converts the absorbed photons into charge carriers by photoelectric conversion. The biasing of the doped regions 40, 42 causes the charge carriers to be collected and output from the photodetector 14 to provide, as a function of time, a measurable photocurrent.

The waveguiding structure including the waveguide cores 12, 13 and the waveguide core segments 20 may significantly improve performance metrics, such as the responsivity, the coupling efficiency, and/or the bandwidth, of the photodetector 14. The performance metrics of the photodetector 14 may be improved by the waveguiding structure without a modification to the shape and/or size of the semiconductor layer 26. The waveguiding structure may enable a reduction in the footprint of the photodetector 14 while maintaining satisfactory performance metrics.

Figure 6:
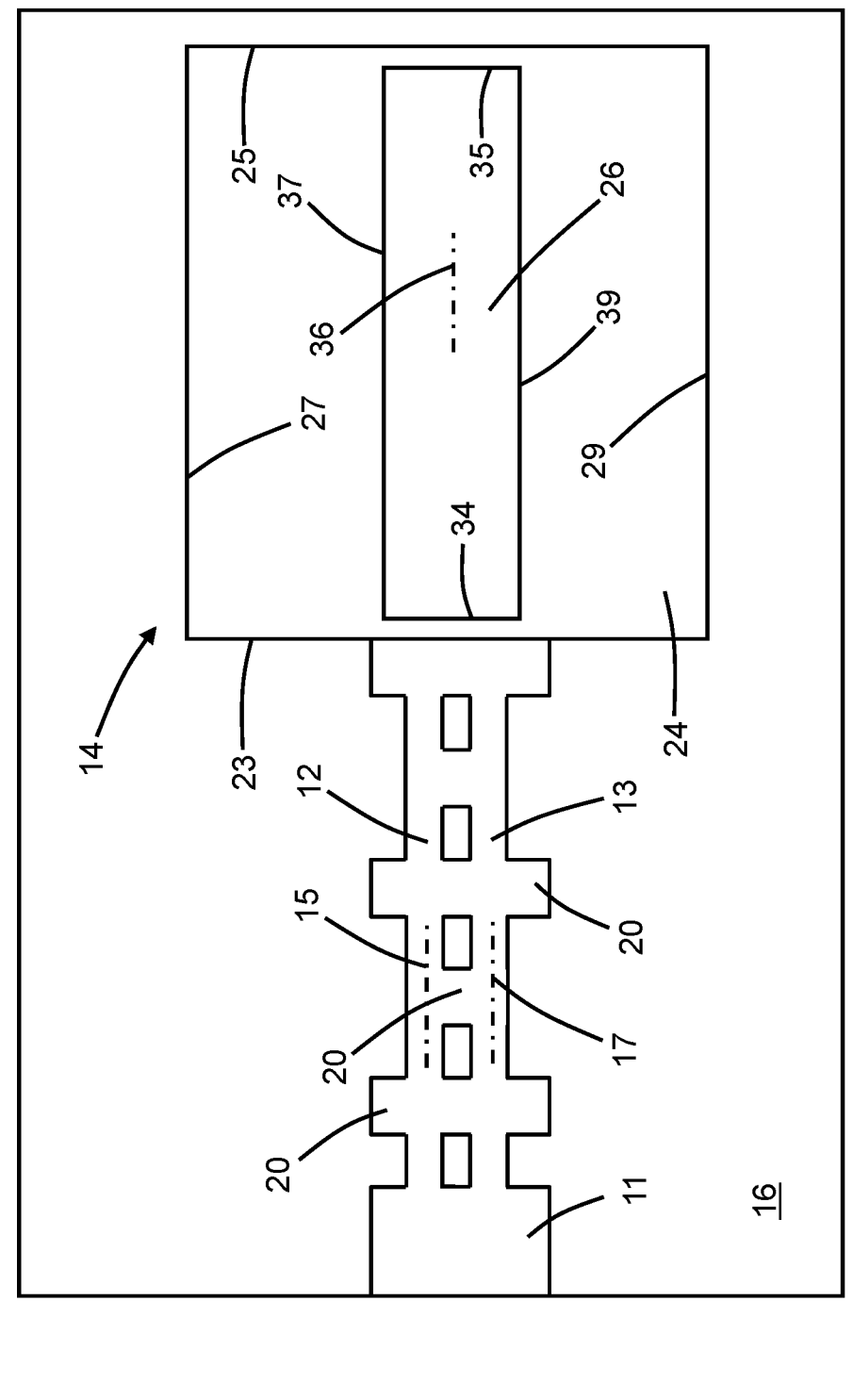
FIG. 6 is a top view of a structure in accordance with alternative embodiments of the invention.

With reference to FIG. 6 and in accordance with alternative embodiments, the length of the waveguide core segments 20 may vary along the length of the waveguiding structure. In an embodiment, one or more of waveguide core segments 20 may lack the projecting end portions at the outer sidewalls 75, 77 of the waveguide cores 12, 13 and may only include the bridging portion that spans the gap G1 between the inner sidewalls 74, 76 of the waveguide cores 12, 13. In an embodiment, one or more of the waveguide core segments 20 lacking the projecting end portions may alternate along the length of the waveguiding structure with the waveguide core segments 20 including the projecting end portions.

Figure 7:
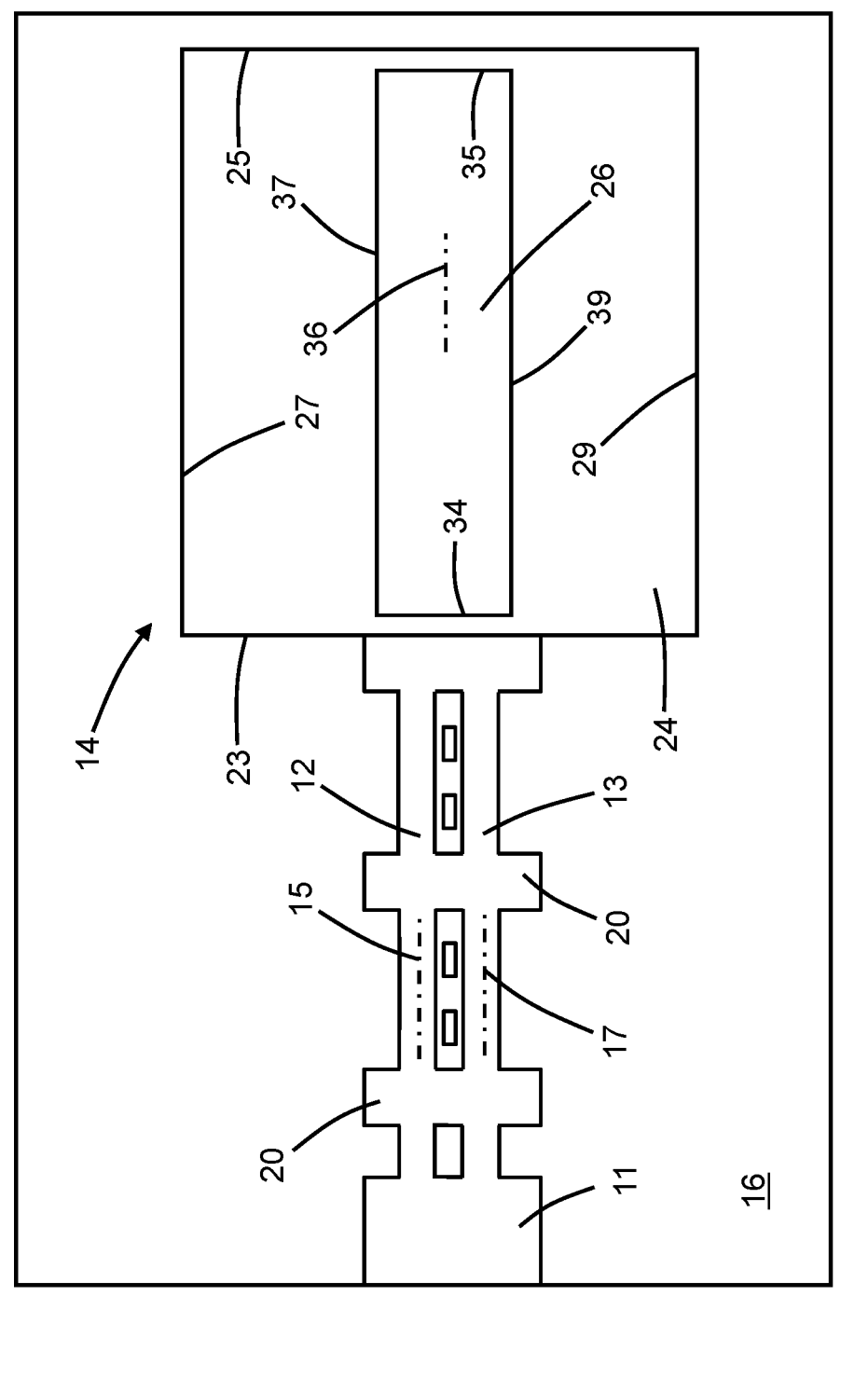
FIG. 7 is a top view of a structure in accordance with alternative embodiments of the invention.

With reference to FIG. 7 and in accordance with alternative embodiments, one or more of the waveguide core segments 20 may be disposed within the gap G1 between the inner sidewall 74 of the waveguide core 12 and the inner sidewall 76 of the waveguide core 13 without bridging the gap G1 between the waveguide core 12 and the waveguide core 13. In an embodiment, one or more of the non-bridging waveguide core segments 20 may alternate along the length of the waveguiding structure with the waveguide core segments 20 including the bridging portion.

Figure 8:
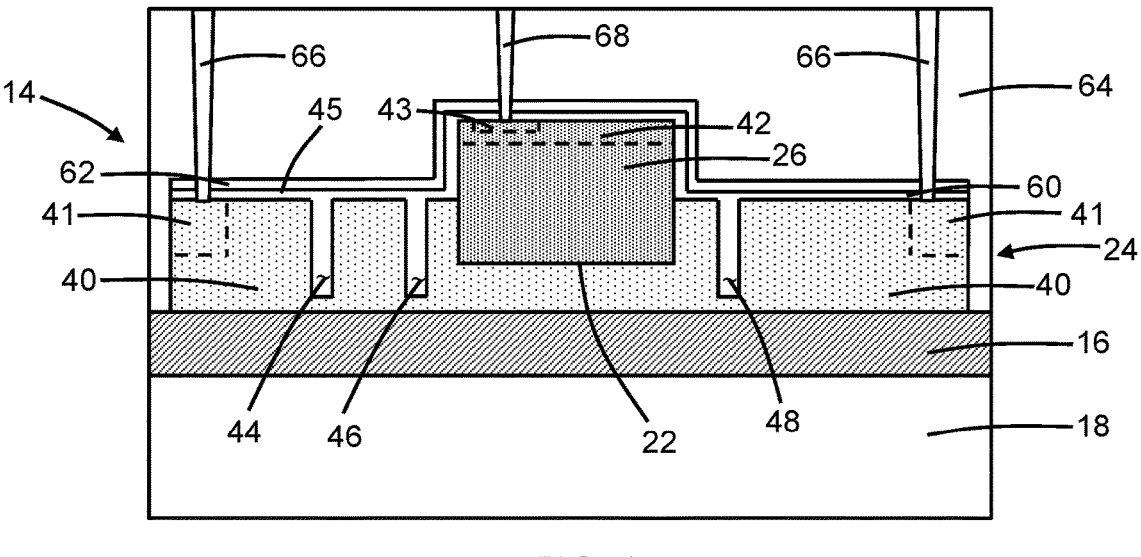
FIGS. 8, 8A are cross-sectional views of structures in accordance with alternative embodiments of the invention.
Figure 8A:
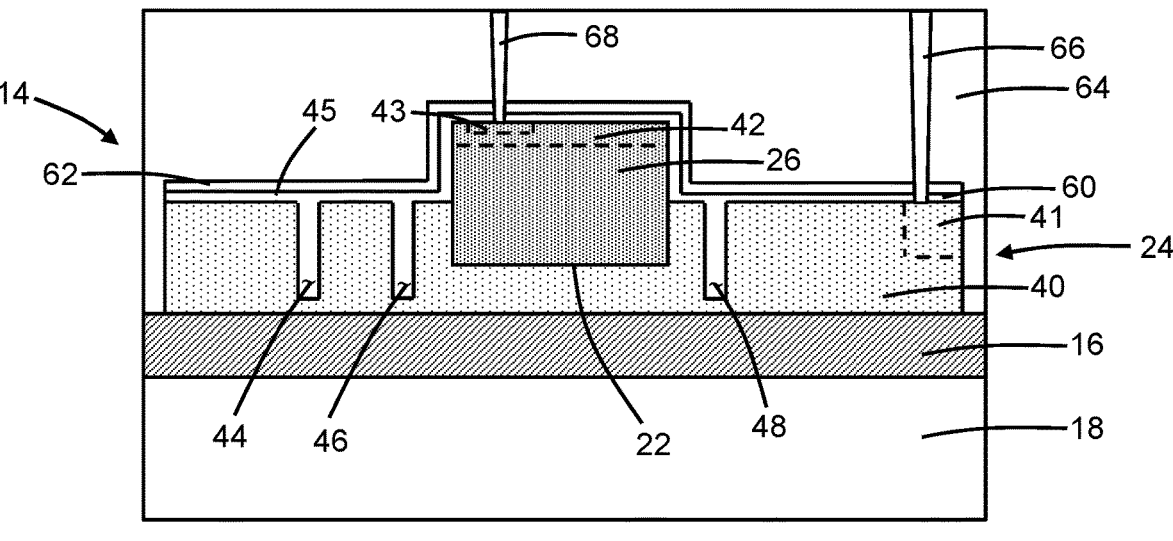

With reference to FIGS. 8, 8A and in accordance with alternative embodiments, the structure 10 may be modified such that the photodetector 14 has a vertical arrangement instead of a lateral arrangement. Specifically, as shown in FIG. 8, the doped region 40 may extend across the entire pad 24, heavily-doped regions 41 may be disposed in the pad 24 on both sides of the semiconductor layer 26, and the doped region 42 and heavily-doped region 43 may be disposed in an upper portion of the semiconductor layer 26. In an alternative embodiment and as shown in FIG. 8A, the structure 10 may be configured with a heavily-doped region 41 disposed in the pad 24 adjacent to only one side of the semiconductor layer 26.

In an alternative embodiment, the semiconductor layer 26 may be fully disposed on, and above, the top surface 28 of the pad 24. In an alternative embodiment, the photodetector 14 may be configured as an avalanche photodetector that includes a region of intrinsic semiconductor material in the pad 24 defining a multiplication region and an additional doped region in the pad 24 defining a charge control region.

Figure 9:
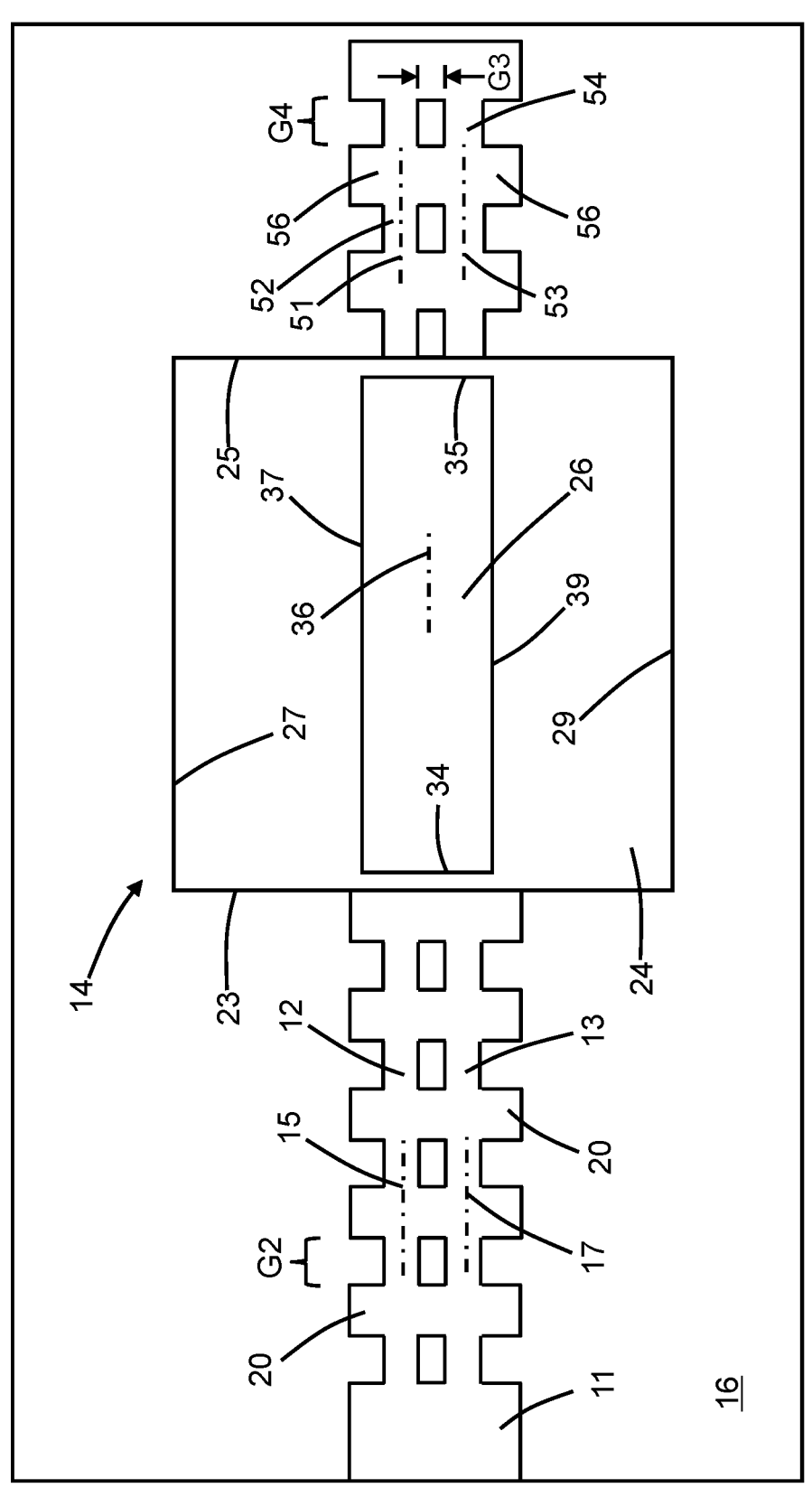
FIG. 9 is a top view of a structure in accordance with alternative embodiments of the invention.

With reference to FIG. 9 and in accordance with alternative embodiments, the structure 10 may further include a waveguiding structure having a waveguide core 52, a waveguide core 54, and waveguide core segments 56. The waveguide cores 52, 54 are similar or identical to the waveguide cores 12, 13, and the waveguide core segments 56 are similar to the waveguide core segments 20. The waveguide core 52 is disposed adjacent to the waveguide core 54 with a slot or gap G3 separating the waveguide core 52 from the waveguide core 54. The waveguide core 52 and the waveguide core 54 may extend lengthwise along respective longitudinal axes 51, 53. The longitudinal axes 51, 53 of the waveguide cores 52, 54 may be aligned parallel to the longitudinal axis 36 of the semiconductor layer 26, and the longitudinal axes 51, 53 of the waveguide cores 52, 54 may be aligned parallel to the longitudinal axes 15, 17 of the waveguide cores 12, 13.

The waveguide core segments 56 of the waveguiding structure are spaced along the longitudinal axis 51 of the waveguide core 52 and the longitudinal axis 53 of the waveguide core 54. In an embodiment, the waveguide core segments 56 may be oriented lengthwise transverse to the longitudinal axes 53, 55 of the waveguide cores 52, 54. In an embodiment, each waveguide core segment 56 may include a portion that bridges across the gap G3 between the inner sidewall of the waveguide core 52 and the inner sidewall of the waveguide core 54, a projecting end portion that projects outwardly from the outer sidewall of the waveguide core 52, and a projecting end portion that projects outwardly from the outer sidewall of the waveguide core 54.

The waveguiding structure including the waveguide cores 52, 54 and the waveguide core segments 56 adjoins (i.e., shares a boundary with) the side edge 25 of the pad 24. In an embodiment, the waveguide core 52 and the waveguide core 54 of the waveguiding structure may adjoin the side edge 25 of the pad 24. In the representative embodiment, the projecting end portions and bridging portion of one of the waveguide core segments 56 may also adjoin the side edge 25 of the pad 24.

The waveguiding structure including the waveguide cores 52, 54 and the waveguide core segments 56 has an envelope at the opposite edges of projecting end portions of the waveguide core segments 56. In the representative embodiment, the envelope of the waveguiding structure may have an effective width dimension that is constant. In an alternative embodiment, the envelope of the waveguiding structure may have an effective width dimension that is tapered. In an alternative embodiment, the width dimension of the envelope may increase either linearly or non-linearly with decreasing distance from the side edge 25 of the pad 24.

The waveguide core segments 56 are characterized by a pitch and a width, and adjacent pairs of the waveguide core segments 56 are separated by a gap G4. In an embodiment, the waveguide core segments 56 may have a uniform pitch and gap G4. In an alternative embodiment, the uniform pitch and gap G4 of the waveguide core segments 56 may vary with position relative to the side edge 23 of the pad 24. In an alternative embodiment, the width of the waveguide core segments 56 may vary with position relative to the side edge 23 of the pad 24. In an alternative embodiment, the sidewalls of the bridging portions of the waveguide core segments 56 may have a curvature and the projecting end portions of the waveguide core segments 56 may be rounded. In an embodiment, the period of the waveguide core segments 20 may be equal to a half-wavelength, or an integer multiple of a half-wavelength, of the light received by the structure 10, and the period of the waveguide core segments 56 may be equal to a quarter-wavelength, or an integer multiple of a quarter-wavelength, of the light received by the structure 10.

The waveguiding structure including the waveguide cores 52, 54 and the waveguide core segments 56 may be concurrently formed with the waveguide cores 11, 13 and the waveguide core segments 20. The waveguiding structure may be comprised of the same material as the waveguide cores 11, 13 and the waveguide core segments 20.

The pitch, width, and/or dimension of the gaps G4 of waveguide core segments 56 may differ from the pitch, width, and/or dimension of the gaps G2 of waveguide core segments 20. In particular, the waveguide core segments 56 and gaps G4 may be dimensioned and positioned with a pitch such that the waveguide core segments 56 are configured to reflect light at a given wavelength of operation in a reverse direction. Arriving light that is not absorbed by the semiconductor layer 26 of the photodetector 14 and that passes through the semiconductor layer 26 may be reflected by the waveguiding structure including the waveguide cores 52, 54 and the waveguide core segments 56 back toward the semiconductor layer 26 and absorbed by the semiconductor layer 26, which may contribute to bandwidth improvement and enable a reduction in the footprint of the photodetector 14.

Figure 10:
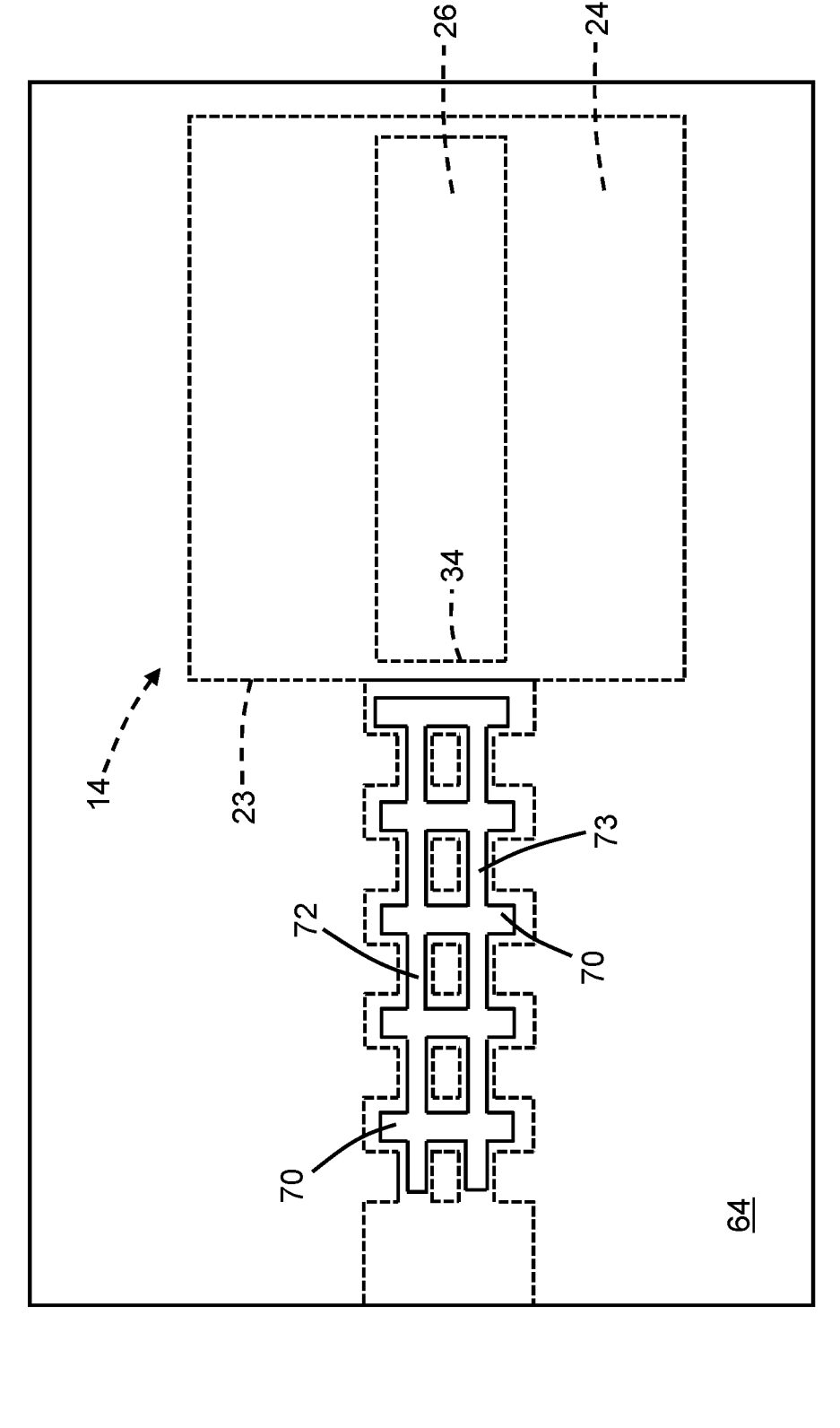
FIG. 10 is a top view of a structure in accordance with alternative embodiments of the invention.

With reference to FIG. 10 and in accordance with alternative embodiments, the waveguiding structure including the waveguide cores 12, 13 and waveguide core segments 20 may further include a waveguide core 72 that is disposed in elevation over the waveguide core 12, a waveguide core 73 that is disposed in elevation over the waveguide core 13, and waveguide core segments 70 are disposed in elevation over the waveguide core segments 20. In an embodiment, the waveguide core segments 70 and waveguide cores 72, 73 may be comprised of a different material than the waveguide core segments 20 and waveguide cores 12, 13. In an embodiment, the waveguide core segments 70 and waveguide cores 72, 73 may be comprised of a dielectric material, such as silicon nitride. In an alternative embodiment, the waveguide core segments 70 and waveguide cores 72, 73 may be comprised of a semiconductor material, such as polysilicon.

In an embodiment, the waveguide core 72 may be narrower than the waveguide core 12 and centered above the waveguide core 12, the waveguide core 73 may be narrower than the waveguide core 12 and centered above the waveguide core 13, and the waveguide core segments 20 may be narrower than the waveguide core segments 20 and centered above the waveguide core segments 20. The waveguide cores 72, 73 and waveguide core segments 70 may function to improve the mode match of light with the photodetector 14.

Figure 11:
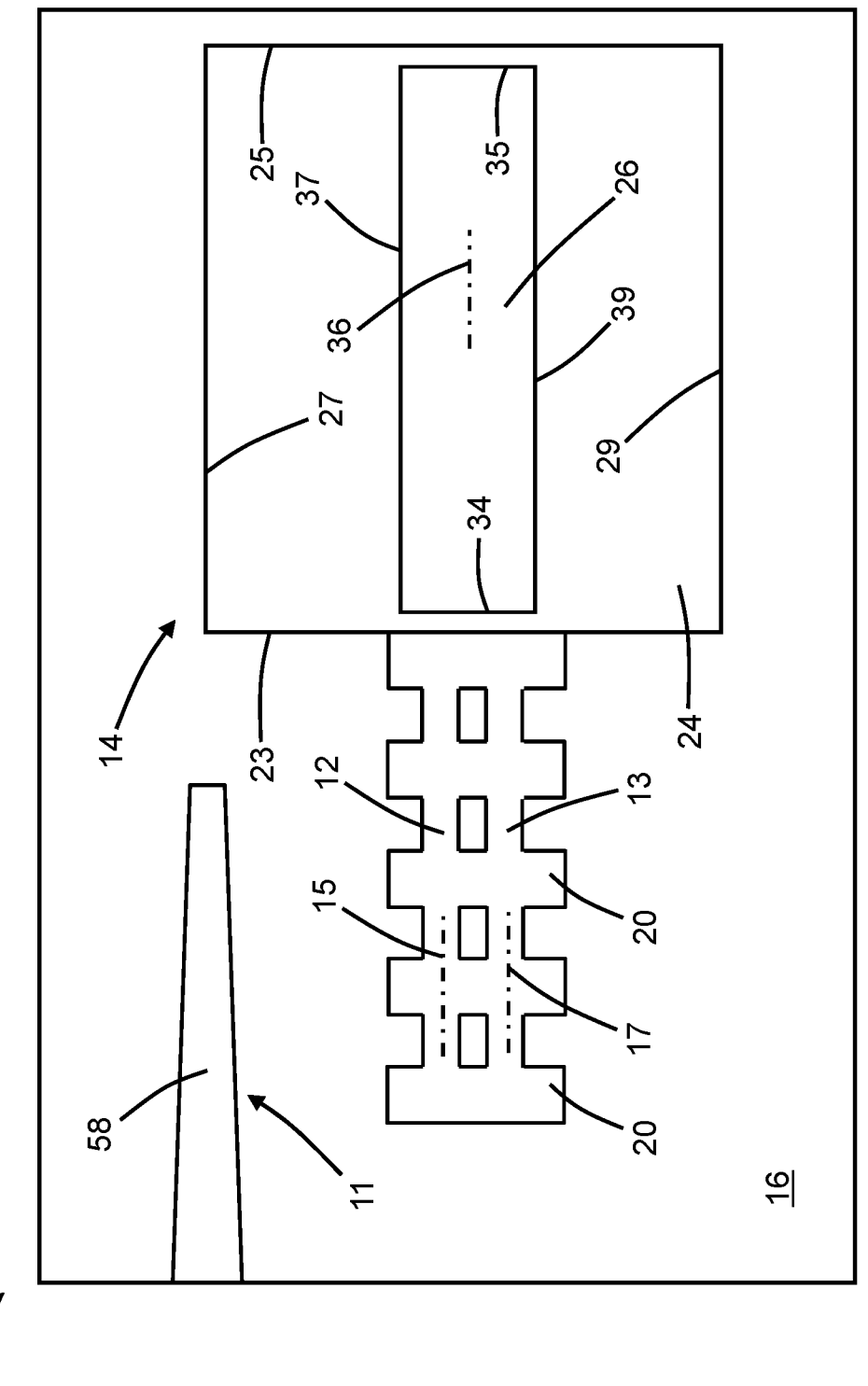
FIG. 11 is a top view of a structure in accordance with alternative embodiments of the invention.

With reference to FIG. 11 and in accordance with alternative embodiments, the waveguide core 11 may include a tapered section 58 that is disposed laterally adjacent to the waveguiding structure including the waveguide cores 12, 13 and waveguide core segments 20. The waveguiding structure may be terminated at the end remote from the side edge 23 of the pad 24 by one of the waveguide core segments 20. The tapered section 58 of the waveguide core 11 may be configured for the lateral transfer of light by evanescent coupling across a gap between the tapered section 58 and the waveguiding structure. For example, the tapering of the tapered section 58 of the waveguide core 11 and the dimension of the gap, among other factors, may enable the evanescent coupling of light. The tapered section 58 of the waveguide core 11 may have an effective width dimension that is tapered toward a terminating end. In an alternative embodiment, the tapered section 58 may be tapered with an effective width dimension that changes either linearly or non-linearly with decreasing distance from the terminating end. The waveguide core 11 may include bends (not shown) that route the waveguide core 11 such that the tapered section 58 is disposed adjacent to the waveguiding structure.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:
   a photodetector including a pad and a semiconductor layer on the pad, the pad including a first side edge; and
   a first waveguiding structure including a first waveguide core, a second waveguide core, a first slot between the first waveguide core and the second waveguide core, and a first plurality of waveguide core segments, the first waveguiding structure adjoined to the first side edge of the pad adjacent to the semiconductor layer, and each of the first plurality of waveguide core segments including a first portion that is disposed in the first slot.

2. The structure of claim 1 wherein the semiconductor layer has a longitudinal axis, and the first slot is centered along the first side edge relative to the longitudinal axis of the semiconductor layer.

3. The structure of claim 1 wherein the pad includes a second side edge opposite from the first side edge, and further comprising:
   a second waveguiding structure including a third waveguide core, a fourth waveguide core, a second slot between the third waveguide core and the fourth waveguide core, and a second plurality of waveguide core segments, the second waveguiding structure adjoined to the second side edge of the pad adjacent to the semiconductor layer, and the second plurality of waveguide core segments extending across the second slot from the third waveguide core to the fourth waveguide core.

4. The structure of claim 3 wherein the semiconductor layer is configured to absorb light having a wavelength, and the second plurality of waveguide core segments have a first period equal to a one-quarter of the wavelength or an integer multiple of one-quarter of the wavelength.

5. The structure of claim 4 wherein the first plurality of waveguide core segments have a second period equal to a one-half of the wavelength or an integer multiple of one-half of the wavelength.

6. The structure of claim 1 wherein the semiconductor layer is configured to absorb light having a wavelength, and the first plurality of waveguide core segments have a period equal to a one-half of the wavelength or an integer multiple of one-half of the wavelength.

7. The structure of claim 1 wherein the first waveguiding structure further includes a third waveguide core disposed in elevation over the first waveguide core, a fourth waveguide core disposed in elevation over the second waveguide core, and a second plurality of waveguide core segments disposed in elevation over the first plurality of waveguide core segments.

8. The structure of claim 7 wherein the first waveguide core, the second waveguide core, and the first plurality of waveguide core segments comprise a first material, and the third waveguide core, the fourth waveguide core, and the second plurality of waveguide core segments comprise a second material different from the first material.

9. The structure of claim 8 wherein the first material is single-crystal silicon, and the second material is silicon nitride or polysilicon.

10. The structure of claim 1 wherein the semiconductor layer comprises germanium.

11. The structure of claim 1 further comprising:
   a first doped region in the pad, the first doped region having a first conductivity type; and
   a second doped region in the pad, the second doped region having a second conductivity type opposite to the first conductivity type,
   wherein the semiconductor layer is disposed on a portion of the pad between the first doped region and the second doped region, and the portion of the pad comprises intrinsic semiconductor material.

12. The structure of claim 1 wherein the first plurality of waveguide core segments are separated by a plurality of gaps, and the first plurality of waveguide core segments and the plurality of gaps are dimensioned and positioned to define a subwavelength grating.

13. The structure of claim 12 wherein the plurality of gaps are filled by portions of a dielectric material to define a metamaterial.

14. The structure of claim 1 further comprising:
   a third waveguide core including a tapered section disposed adjacent to the first waveguide core of the first waveguiding structure, the tapered section of the third waveguide core separated from the first waveguiding structure by a gap, and the tapered section of the third waveguide core configured to transfer light to the first waveguiding structure.

15. The structure of claim 1 wherein the first waveguide core has a first longitudinal axis, the second waveguide core has a second longitudinal axis, and each of the first plurality of waveguide core segments is lengthwise aligned transverse to the first longitudinal axis and transverse to the second longitudinal axis.

16. The structure of claim 1 wherein the first waveguide core has a first sidewall bordering the first slot and a second sidewall opposite from the first sidewall, and each of the first plurality of waveguide core segments has a second portion that projects outwardly from the second sidewall of the first waveguide core.

17. The structure of claim 16 wherein the second waveguide core has a first sidewall bordering the first slot and a second sidewall opposite from the first sidewall, and each of the first plurality of waveguide core segments has a third portion that projects outwardly from the second sidewall of the second waveguide core.

18. The structure of claim 17 wherein the first portion of each of the first plurality of waveguide core segments extends across the first slot from the first waveguide core to the second waveguide core.

19. The structure of claim 1 wherein the first portion of each of the first plurality of waveguide core segments extends across the first slot from the first waveguide core to the second waveguide core.

20. A method of forming a structure for a photonics chip, the method comprising:
   forming a photodetector that includes a pad and a semiconductor layer on the pad; and
   forming a waveguiding structure that includes a first waveguide core, a second waveguide core, a slot between the first waveguide core and the second waveguide core, and a plurality of waveguide core segments, wherein the waveguiding structure is adjoined to a side edge of the pad adjacent to the semiconductor layer, and each of the plurality of waveguide core segments includes a portion that is disposed within the slot.

\* \* \* \* \*